Patented Nov. 12, 1940

2,221,356

UNITED STATES PATENT OFFICE 2,221,356

MANUFACTURE OF ALKALI PHOSPHATES

Anton Michels, Budenheim, near Mainz, Germany, assignor to Chemische Fabrik Budenheim Aktiengesellschaft, Mainz, Germany No Drawing. Application June 28, 1938, Serial No. 216,331. In Germany July 15, 1937

2 Claims. (Cl. 23—106)

This invention relates to the manufacture of alkali phosphates and especially of tri-alkali phosphates. It is known to manufacture alkali phosphates from phosphoric acid made either by a thermal or by a wet process by saturating the phosphoric acid to the desired degree, with alkali, for example soda or NaOH, and then causing the solution to crystallize. Since the manufacture of phosphoric acid by thermal methods requires a considerable expenditure of energy and when it is produced by wet methods the valuable sulphuric acid is converted into the less valuable gypsum, attempts have not been lacking to manufacture alkali phosphate directly from crude phosphate and alkalies. The direct decomposition has, however, been successfully effected only with phosphates of aluminum and iron.

In the processes previously proposed the aim always was to convert the calcium oxide formed into insoluble calcium carbonate before or during the extraction of the ignited or molten mass, for example by conducting $CO_2$ over it or by the addition of soda to the extraction liquor. These processes, however, have not been adopted in practical operation owing to their obvious lack of economy.

It is an object of my present invention to provide an efficient and relatively inexpensive process for the direct decomposition of crude phosphate by alkalies.

A further object of the present invention is the provision of a process, whereby calcium-containing phosphates can be converted into tri-alkali phosphates or fluorine-containing tri-alkali phosphates at relatively low temperatures and in a short time.

I have found that alkali phosphate can be directly and economically obtained from calcium phosphates if care be taken to exclude carbonic acid. If a mixture of crude phosphate and, for example, caustic soda solution is dried and ignited in the usual manner, for example in a rotary tube or reverberatory furnace, the decomposition proceeds, as is well known, with only a poor yield. If, on the other hand, the drying and ignition is carried out in accordance with my invention with the exclusion of carbonic acid the yields approach the theoretical. If caustic soda or caustic soda solution is used as the alkali for effecting the decomposition, the additional advantage is obtained that the thermal treatment can be completed at an extremely low temperature and in addition in a very short time. Thus, for example, it is possible in this way to convert apatite into tri-sodium phosphate or fluorine-containing tri-sodium phosphate within one hour at a temperature of only 400–500° C. The procedure may then be as follows:

The finely ground apatite is made into a paste with, preferably concentrated, caustic soda solution, the mixture is then quickly dried and is ignited, for example, in a tunnel kiln or furnace which is heated either externally or may be provided with internal electric heating.

The fact that the carbonic acid is of decisive importance on the course of the alkaline decomposition is both new and unexpected. It could not be foreseen that if carbonic acid were excluded the decomposition would proceed at such low temperatures and in such a short space of time.

It is obvious that, for obtaining the highest yields, the impurities which are contained in the apatite, for example silicic acid, alumina and other impurities which combine alkali must be taken into account when calculating the quantity of alkali required. The excess of alkali beyond the proportion $1P_2O_5:3Na_2O$ which is necessary for the formation of tri-sodium phosphate may vary within wide limits. The quantity of alkali may, however, be reduced by subjecting the crude phosphate to a preliminary purifying treatment, for example by means of a chlorinating roasting, by treating the crude phosphate at an elevated temperature simultaneously with gaseous chlorine and hydrochloric acid, or it may be purified by an alkaline oxidising treatment, by igniting the crude phosphate with a small quantity of alkali in the presence of an oxidising agent and then leaching it out in water. By this means the purity of the alkali phosphate which is obtained in accordance with the present invention is also increased. No attention need be paid to any content of calcium carbonate because this does not react under the aforesaid conditions with soda lye or caustic soda. The residue from the leaching out process represents a high-grade fertilizer in which the undecomposed phosphoric acid present is fully citrate soluble. The phosphate goes completely into solution in a much shorter time than usual in the case of fertilizers.

The present invention is not limited to the use of caustic soda or caustic potash. Instead of this, for example, sodium carbonate can be employed, in a similar manner, that is to say the crude phosphate is made up into a paste with sodium carbonate solution and rapidly dried or the phosphate is mixed with dry soda. The temperature required for the ignition is then about 400° higher. Care, however, should be taken that not only is the carbonic acid evolved in the ignition process rapidly conducted away but also that no fresh carbonic acid has access. All apparatus such as rotating tubes on which the flame directly impinges are therefore unsuitable for the process since it is important in accordance with the invention that the access of carbonic acid be excluded under all circumstances. It is also possible to operate the process as a sintering process and to avoid expensive melting.

The yields can be increased by leaching out the heated product with hot water, for example at a temperature of about 100° C. and using the smallest possible quantity of water so that hot concentrated solutions are formed. For this purpose the mother liquors from the crystallisation can be additionally employed.

Example 1

100 kg. of a phosphate containing

| | Percent |
|---|---|
| $P_2O_5$ | 36.25 |
| $Fe_2O_3$ | 0.72 |
| $Al_2O_3$ | 2.73 |
| $SiO_2$ | 5.83 |
| F | 3.40 | are made into a paste with 80 kg. caustic soda in the form of a soda lye of approximately 40° Bé. The paste is rapidly dried with the exclusion of $CO_2$ and is kept in an electrically heated furnace for a period of one hour at a temperature of 500° C. The product is disintegrated, leached out quickly in hot water and filtered. 67.5% of the $P_2O_5$ employed are present in the solution as tri-sodium phosphate.

Example 2

A phosphate containing

| | Per cent |
|---|---|
| $P_2O_5$ | 34.1 |
| $SiO_2$ | 1.88 |
| F | 2.57 |
| $Al_2O_3$ | 0.82 |
| $Fe_2O_3$ | 0.90 | which has been purified by a preparatory oxidising and alkaline treatment is employed as the starting material. 100 kg. of this phosphate are mixed with 65 kg. of caustic soda and are then treated, as in Example 1.

80.90% of the $P_2O_5$ are present in the solution as tri-sodium phosphate.

The leaching out is undertaken in about 73 kg. of water, the material being stirred for about 10 minutes at a temperature of 100° C. A saturated solution is formed which is filtered through a pre-heated filter; on cooling to 20° C. about 90% of the $Na_3PO_4$ present in the solution separates in solid form. The precipitated tri-sodium phosphate is centrifuged off from the mother liquor and the mother liquor is employed for leaching out the product from the next ignition.

Example 3

100 kg. of phosphate containing

| | Per cent |
|---|---|
| $P_2O_5$ | 33.62 |
| $SiO_2$ | 0.71 |
| $Al_2O_3$ | 0.71 |
| $Fe_2O_3$ | 0.32 |
| F | 4.12 | are well mixed with 90 kg. sodium carbonate and are kept for one hour in an electric furnace at a temperature of 900° C. During the ignition steam or another inert gas is conducted through the furnace in order to remove the carbonic acid immediately it is liberated. Care must be taken that the carbonic acid is quickly removed and no new carbonic acid can have access to the furnace.

The disintegrated product is leached out in the same manner as described in Example 2. The yield is 78% on the $P_2O_5$.

Example 4

100 kg. of the phosphate employed in Example 3 are well mixed with 96 kg. caustic potash and then treated as in Example 2. A yield of 77.6% $P_2O_5$ as tri-potassium phosphate is obtained which is worked up in known manner to anhydrous tri-potassium phosphate.

Having now particularly described and ascertained the nature of my said invention and in what manner the same is to be performed, I declare that what I claim is:

1. In a process for the manufacture of tri-alkali phosphates, the steps of heating, and in the absence of any added oxidizing agent and combustion gases, crude phosphate rock and an alkali metal compound which is alkaline in reaction together at a temperature above about 400° C., avoiding access of carbonic acid from the exterior during this heat treatment, rapidly removing such carbonic acid as may be evolved by the heat treatment, and extracting the heated product, the alkali metal compound being employed in such quantity as to provide at least three equivalents thereof for each equivalent of bound $P_2O_5$ in the said phosphate.

2. The process according to claim 1, the crude phosphate rock being crude tri-calcium phosphate rock and the alkali metal compound being caustic soda.

ANTON MICHELS.